United States Patent [19]
Binnig et al.

[11] Patent Number: 6,092,422
[45] Date of Patent: Jul. 25, 2000

[54] MECHANICAL SIGNAL PRODUCER BASED ON MICROMECHANICAL OSCILLATORS AND INTELLIGENT ACOUSTIC DETECTORS AND SYSTEMS BASED THEREON

[75] Inventors: Gerd K. Binnig, Wollerau; Pierre L. Guéret, Thalwil; Heinrich Rohrer, Richterswil; Peter Vettiger, Langnau, all of Switzerland

[73] Assignee: International Business Machines Corporation, Armonk, N.Y.

[21] Appl. No.: 09/029,894

[22] PCT Filed: Sep. 29, 1995

[86] PCT No.: PCT/IB95/00817

§ 371 Date: Mar. 10, 1998

§ 102(e) Date: Mar. 10, 1998

[87] PCT Pub. No.: WO97/13127

PCT Pub. Date: Apr. 10, 1997

[51] Int. Cl.[7] .................................................. G01D 21/00
[52] U.S. Cl. .................................. 73/651; 310/331; 181/5
[58] Field of Search ............................. 73/651, 652, 662, 73/777, 778, 649, 862.59, 504.15, 504.16; 310/321, 328, 330, 331, 370; 324/76.49; 331/158; 181/5

[56] References Cited

U.S. PATENT DOCUMENTS

| | | | |
|---|---|---|---|
| 4,594,898 | 6/1986 | Kirman et al. | 73/778 |
| 4,609,844 | 9/1986 | Nakamura et al. | 310/321 |
| 4,612,471 | 9/1986 | Nakamura et al. | 310/321 |
| 4,856,350 | 8/1989 | Hanson | 73/862.59 |
| 4,970,903 | 11/1990 | Hanson | 73/862.59 |
| 5,095,763 | 3/1992 | Delattore | 73/862.59 |
| 5,367,217 | 11/1994 | Norling | 310/370 |

*Primary Examiner*—Richard A. Moller
*Attorney, Agent, or Firm*—F. Chau & Associates, LLP

[57] ABSTRACT

The present invention concerns mechanical signal processing comprising a mechanical adder as a basic building block. Such a mechanical adder (40), which is a basic element of the present invention, comprises a first micromechanical member (40.1) being sensitive to a first frequency ($f_1$) and a second micromechanical member (40.2) being sensitive to a second frequency ($f_2$). The two micromechanical members (40.1, 40.2) are coupled via a linear coupling (41) to provide a superposition (sum) of the two frequencies ($f_1$ and $f_2$). Based on the adder, AND-gates and OR-gates can be realized by adding further micromechanical members and appropriate linear and non-linear coupling elements.

17 Claims, 10 Drawing Sheets

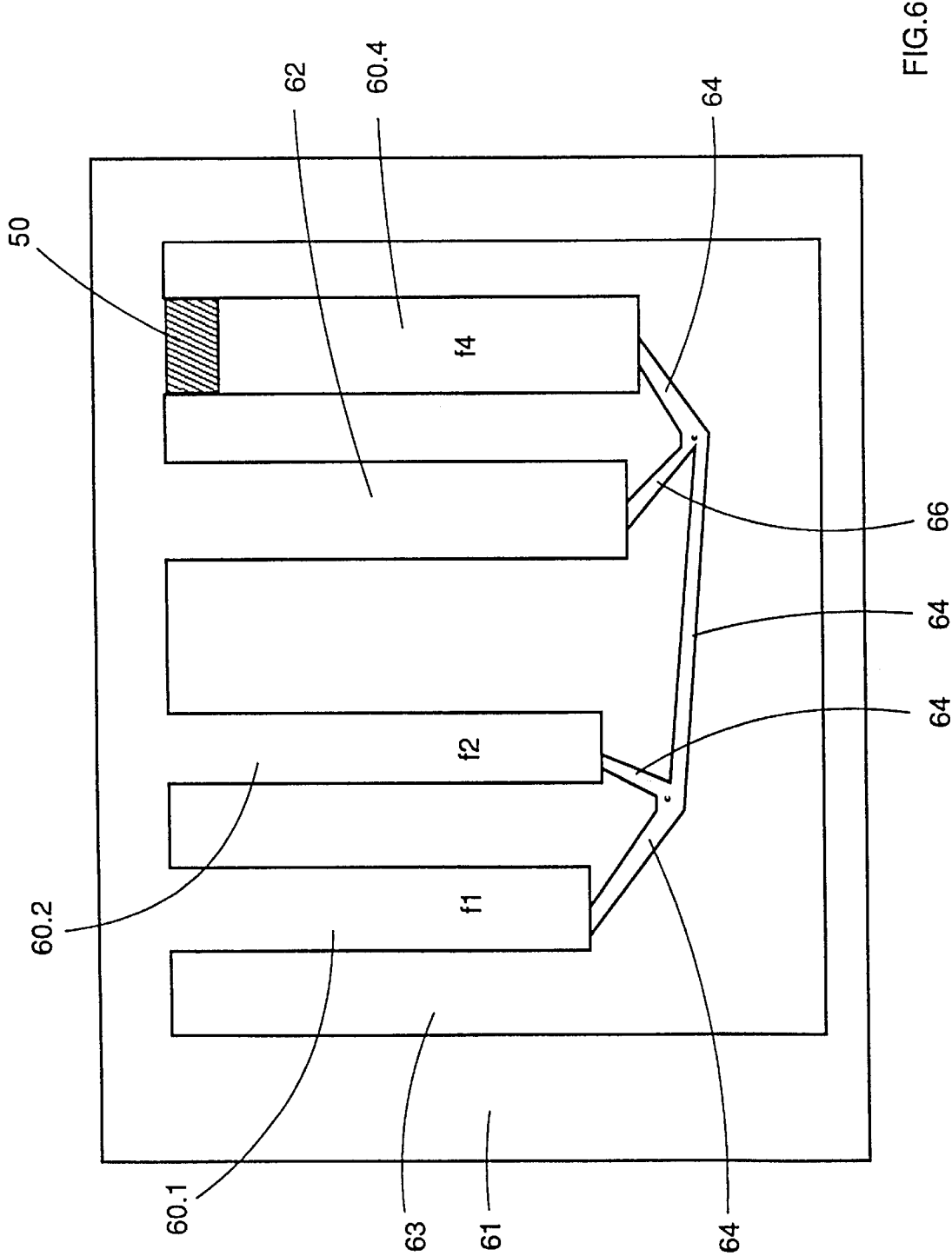

MECHANICAL SIGNAL PRODUCER BASED ON MICROMECHANICAL OSCILLATORS AND INTELLIGENT ACOUSTIC DETECTORS AND SYSTEMS BASED THEREON

TECHNICAL FIELD

The present invention relates to mechanical signal processors, and in particular acoustic detectors, comprising micromachined sensor arrays for the detection, recognition and analysis of mechanical signals like sound, noise, vowels, speech, voices and so forth, or electrical signals of similar kind.

BACKGROUND OF THE INVENTION

There is a demand for detectors and microphones which translate any kind of acoustic signal, e.g. sound, noise, vowels, speech, voices, into electrical signals.

Examples for acoustic detector systems are hearing aids which receive and amplify acoustic signals and generate an amplified acoustic signal which can be fed into the outer ear, or special hearing aids which apply electric signals to the inner part of the ear by means of electrodes such that certain segments of the ear are stimulated. The stimulation of the ear by means of electrodes, implanted into the ear, is often used if a person is deaf or partially deaf. Nowadays, in certain cases electrodes are even implanted into the inner ear directly contacting the nerves of the ear. Current hearing aids rely on a conventional microphone the output signal of which is amplified and fed via a speaker into the outer ear. In case of electrodes being implanted into the ear or even in proximity of the hearing nerves a processor is employed to process the electrical signal output by a microphone in order to generate electrical pulses which can be fed to the electrodes. The processing is very complex and such hearing aids which are designed for implantation into the human ear are currently expensive and not very powerful. Usually, only twelve electrodes are employed to stimulate the nerves in the inner ear. It is obvious that such a system stimulating the ear only with a small number of electrodes never will reach the capabilities of a healthy, fully functional human ear. Accordingly, there is a demand for a detector or microphone that really simulates the function of the human basilar membrane and inner ear and thus may serve as a replacement for a destroyed or defective organ of hearing.

Speech detection and recognition systems are another field where acoustic detectors (microphones) can be used. Speech recognition system are currently used to simplify input of commands or text into a computer, for example. Also handicapped persons rely more and more on technical and electrical apparatus which can be operated by giving acoustic commands. Furthermore, pilots, car-drivers, technicians, and surgeons will use such speech recognition systems as they become more powerful and reliable.

Todays speech recognition systems rely on conventional microphones which are used for transformation of acoustic signals into electric signals which are then processed and analyzed in the frequency domain. These electric signals are then fed to a processor which tries to recognize letters, syllables, words and whole sentences. These systems require lots of computing power because complex analysis are carried out and a comparison with a speech data base (knowledge base) is required. An enormous amount of incoming data is to be processed within a short period of time to ensure an acceptable response time and reliable recognition.

There is also a great demand for acoustic detectors which are designed to detect a particular noise or sound. Such a detector could for example be used to indicate whether an engine is about to get destroyed, or to detect acoustic signals which can otherwise not be detected by the human ear. In noisy environment, e.g. in a cockpit, it would be useful to reduce or eliminate the noise so as to ensure that voice and other signals can be better understood. Such detectors which are sensitive to a particular noise are usually realized by means of a conventional microphone, or a microphone which is sensitive in the particular range of frequencies, followed by an electronic circuitry or computer for analysis of the electric signals output by the microphone. Currently, there is a trend towards cars having an active microphone/loudspeaker system for the suppression of noise entering the passenger compartment. By means of a microphone the noise of the tires, for example, is collected and transformed into electrical signals. These signals are then amplified and phase-shifted before they are converted back into acoustic signals by means of a set of loudspeakers. The superposition of the original noise and the phase-shifted noise leads to a reduction in the overall noise level.

As can be seen from the above examples, most of the known systems for the detection of sound, noise, vowels, speech, voices, etc., employ an electronic circuitry or computer for processing and analysis of the electrical signals provided by a conventional microphone.

In order to further improve such systems and to make them cheaper, one needs smaller microphones and detectors. In addition, such microphones and detectors should be cheap, reliable and lightweight. In particular those systems which require analysis of acoustic information, e.g. speech recognition systems, call for time-consuming processing by a computer or the like. The success and price of such systems strongly depends on a simplification and improvement of known approaches.

As reported in the art, micromechanical elements are suited to replace conventional microphones and sensors. A micromechanical microphone, for example, is described in "A New Condensor Microphone in Silicon", J. Bergqvist et al., Sensors and Actuators. A21–A23, 1990, pp. 123–125. This microphone functions almost like a conventional microphone, with the difference that it is much smaller. In another article with title "Silicon Micromechanics: Sensors and Actuators on a Chip", R. T. Howe et al., IEEE Spectrum, July 1990, pp. 29–35, and in particular on page 31, it is mentioned that microvibrating beams, like a guitar string, react to a change of tension by a shift in its resonant frequency. This is an effect which probably allows to realize a microphone using such a vibrating beam being sensitive to noise. The shift in resonant frequency could be detected and transformed in an appropriate electrical signal for further processing. In the German article "Mikromechanik—Der Chip lernt fühlen", A. Heuberger, VDI nachrichten magazin, 4/85, pp. 34–35, it is mentioned that an integrated sensor with a number of silicon beams, matching certain resonant frequencies, could be realized. However, it is mentioned at the same time, that such an integrated sensor will require a computer based analysis of the signals generated by the silicon beams.

The above three examples show that conventional microphones will be replaced by micromechanical structures in the near future. Such a miniaturization is welcome and leads to improvements of conventional systems and might even open up certain new opportunities because of its reduced size and price. However, there is still an immense amount of processing required for most of the above applications There is also a demand for systems performing pattern recognition of electrical signals, in the range of 1 Hz to 1 MHz, as well as for systems processing and analysing mechanical forces in a reliable and fast manner.

It is an object of the present invention to provide a method and apparatus for reliable processing of acoustic, mechanical, and electrical signals.

It is an object of the present invention to provide a method and apparatus which improves known acoustic detectors and microphones.

It is an object of the present invention to provide a new approach for the detection, transformation and processing of acoustic signals and to provide systems based on this new approach.

It is another object of the present invention to provide a new approach for the analysis of acoustic signals and to provide systems based on this new approach.

It is a further object of the present invention to provide improved hearing aids, speech recognition systems, and sound, noise, vowels, speech, and voices detectors and noise eliminators.

SUMMARY OF THE INVENTION

This has been achieved by the provision of two or more mechanical oscillators being coupled by means of linear and/or non-linear coupling elements. The oscillators cover all relevant frequencies in the signal to be analyzed or processed. The coupling achieved by the coupling elements in connection with the oscillators do the mechanical processing of the signals. The coupling elements and oscillators are arranged such that a particular oscillation component (meaning a particular conmbination of base frequencies and higher harmonic frequencies, i.e. a particular term of the trigonometric equation describing the oscillation) is detected or selected for further mechanical processing.

A mechanical adder, which is a basic element of the present invention, comprises:

a first micromechanical member being sensitive to a first frequency ($f_1$), and a second micromechanical member being sensitive to a second frequency ($f_2$).

These two micromechanical members are coupled via linear coupling means provide a superposition (sum) of the two frequencies $f_1$ and $f_2$.

Based on the above adder, an AND-gate can be realized by adding a third micromechanical member provided with an oscillation detector and being sensitive to a third frequency ($f_3$). This third oscillator needs to be coupled via non-linear coupling means to said adder such that it is stimulated by the oscillation of said first and second members and effects an oscillation of said third member. The resonance frequency $f_3$ of this third member is a combination of $f_1$ and $f_2$ depending on the type of non-linear coupling which excites said third member. In the case of quadratic coupling, $f_3$ is close to either the sum or difference of $f_1$ and $f_2$. The oscillation of this third member is then detected by said oscillation detector.

In addition to the above described AND function, OR-gates, and threshold detectors can be realized according to the present invention.

The present detectors facilitate improved and even completely new speech recognition systems, hearing aids and other acoustic systems. Furthermore, the proposed acoustical signal processing can be used to also analyze electrical signals, when this electrical signal is transformed first into an acoustic one before being fed to an acoustic detector in accordance with the present invention.

The present invention further facilitates mechanical signal processing systems, e.g. for the analysis and processing of forces.

Mechanical signal processors and acoustic detectors, as herein disclosed, made of silicon or similar materials, show advantages over traditional devices. Low-cost batch fabrication of extremely small structures with well controlled dimensions and properties as well as the range of intrinsic properties of these materials, and in particular silicon, are characteristics that facilitate the present devices. A high degree of miniaturization can be achieved and inexpensive devices for the consumer market and especially designed devices for high-end applications can be made.

DESCRIPTION OF THE DRAWINGS

The invention is described in detail below with reference to the following schematic drawings:

FIG. 6 is a schematic top view of a mechanical OR-gate, in accordance with the present invention, serving as basic building block of different embodiments.

GENERAL DESCRIPTION

Before different embodiments of the present invention are described, their basic elements are addressed.

Cantilevers

Cantilevers are well known micromechanical elements which are easy to make. Existing semiconductor fabrication processes can be employed. In essence, the techniques of micromachining are employed to create discrete cantilevers and arrays of cantilevers. If complicated structures are required, a technique called focussed ion-milling can be used. This technique is not well suited for mass-fabrication. In this technique, the substrate to be worked on is enclosed in a vacuum chamber at a base pressure of about $2.3 \times 10^{-6}$ mbar. From an ion source, gallium (ga) ions are accelerated to by a high voltage (10–30 kV) and focussed on the target. A current of 12–300 pA is used to erode the material at the target spot. The efficiency of the process can be enhanced by directing a stream of chloride molecules to a target area. All different kind of micromechanical structures can be comfortably produced by applying this method. The equipment for focussed ion milling is commercially available.

When dimensioning cantilevers, one has to take into account specific parameters of the material used as substrate in which the cantilevers are formed. Usually, cantilevers and cantilever arrays are made by etching away portions of a silicon substrate, the substrate being (100) or (111) oriented. (100) oriented silicon could for example be wet etched using ethyl diamine pyrocatechol or KOH solutions. Wet etching techniques are generally dependent on crystallographic orientation of the substrate, e.g. (100) oriented silicon shows a very low etch rate of the (111) plane, leading to a good etch stop along the (111) axis which generates well defined etch planes with 54.7° angles from (100). An alternative approach makes use of dry etching techniques, e.g. reactive-ion beam etching (RIE), chemically assisted ion beam etching, or microwave assisted plasma etching. In particular the RIE techniques are well suited for batch fabrication of single devices or arrays. The above mentioned focussed ion-milling technique is yet another way to make cantilever structures. Depending on process conditions, deep and anisotropic structures can be obtained leading to excellent dimensional control. Masks can be employed to define the structures to be etched. The cantilevers used may have any shape that can be obtained by photolithography and etching as well as focussed ion milling. The cross-sectional shape could for example be rectangular, round, elliptical, or polygonal.

Figure 1:
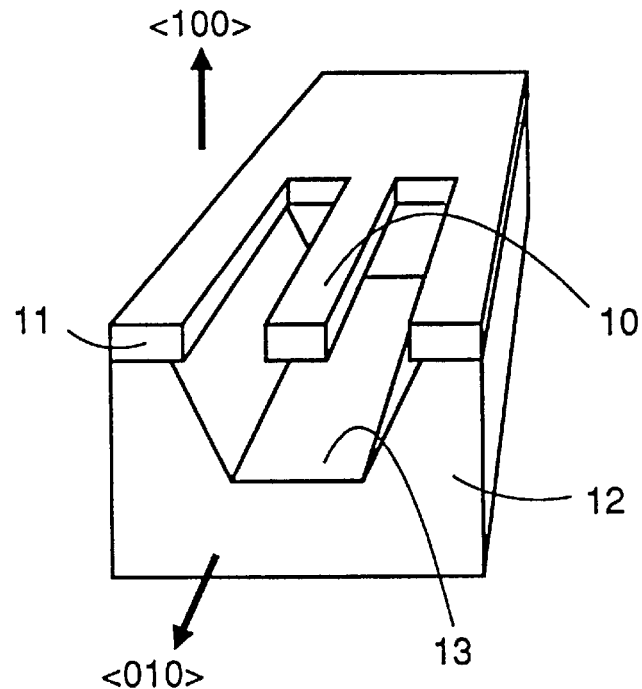
FIG. 1 shows a perspective view of a cantilever, in accordance with the present invention.

A cantilever 10, which might be used in connection with the present invention, is illustrated in FIG. 1. As shown in this Figure, there is a substrate 12 which is covered with layer 11. This layer 11 and the substrate 12 are etched so as to form a cantilever 10. This cantilever extends into a groove 13. In the present Figure the orientation of the substrate <100> is indicated.

Also suited for the fabrication of cantilevers are other semiconducting materials, like gallium arsenide, for example, as reported in "dynamic Micromechnics on Silicon: Techniques and Devices", K. E. Petersen, IEEE Transactions on Electronic Devices, Vol. ED25, No. 10, 1978, pp. 1241–1249.

By suitable design of such a cantilever one obtains a micromechanical member being sensitive to a certain frequency. Choosing the right shape, length and material one obtains a member which starts to strongly vibrate (oscillate) if a force, e.g. an acoustic signal, with a particular frequency of sufficient amplitude (strength) is applied. The oscillation might as well be excited by acoustical or ultrasonic soundwaves in the substrate carrying the cantilevers.

According to the present invention, the resonant frequency of a cantilever is chosen to approximately match the frequency which is to be detected by this particular cantilever. The first mechanical resonance can be calculated from $$f_R = 0.162 \frac{t}{2} \sqrt{\frac{E}{\rho}} \kappa \quad (1)$$

where $\kappa$ is a correction factor (close to one) depending on the density of the canilever material, Young's modulus E (For thin $SiO_2$; $E=6.7 \times 10^{10} N/m^2$), and other structural details. I is the cantilever length, t the cantilever thickness, $\rho$ density. The highest resonant frequency observed so far with simple silicon cantilevers is about 1.25 MHz, see "Silicon as Mechanical Material", K. E. Peterson, Proceedings of the IEEE, Vol. 70, No. 5, May 1982, p. 447. The human ear is sensitive to frequencies up to 2000 Hz, which is about 60 times less than the frequencies that can be detected with todays micromechanical cantilevers.

Bridges

Figure 2:
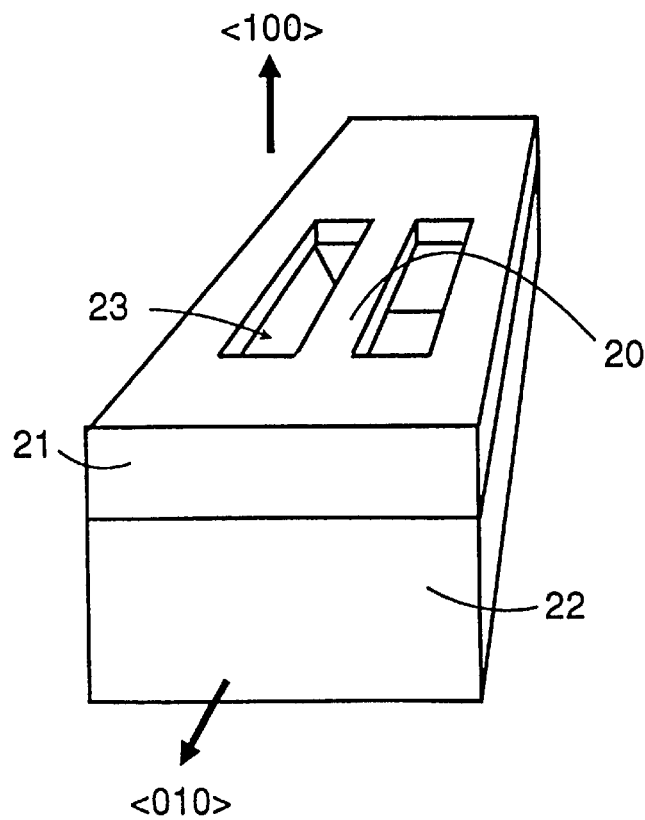
FIG. 2 shows a perspective view of a bridge, in accordance with the present invention.

A bridge is a beam that is clamped at both ends; like a guitar string. An example is illustrated in FIG. 2. There is a substrate 22 on which a layer 21 is formed. The substrate and layer are structured, e.g. by means of lithography and etching, such that a bridge 20 is formed above a groove 23.

There is a differential equation which can be solved analytically resulting in an implicit force-frequency equation for the relation between the resonance frequency and the pulling force, i.e. the force leading to a given tension in the bridge. This equation can be approximated for small forces by $$f \simeq f_0 \left\{ 1 + 0.3 \left[\frac{l}{t}\right]^2 \frac{F}{Ebt} \right\}^{1/2} \quad (2)$$

with f the loaded resonant frequency, $f_0$ the unloaded resonant frequency, F the pulling force, E the Young's modulus, I the length of the bridge, t its thickness and b its width. The above equation (2) is useful to calculate properties of the bridge, such as its sensitivity. The exact shape of such a bridge, if used in an acoustic detector according to the present invention for example, must be chosen with care taking into account the way an acoustic wave or other force acts on the clamped beam. Further details are for example given in "Resonating Silicon Beam Force Sensor", F. R. Blom et al., Sensors and Actuators, 17, 1989, pp. 513–519.

Membranes

Figure 3:
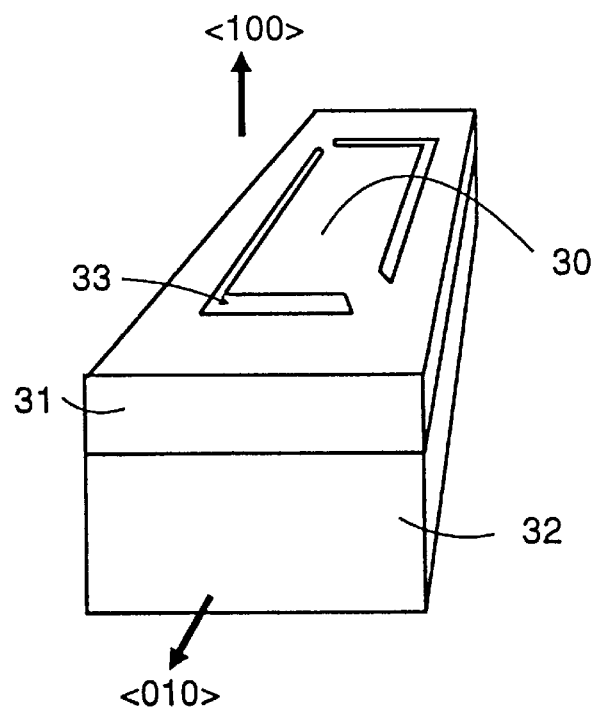
FIG. 3 shows a perspective view of a membrane, in accordance with the present invention.

Instead of employing a bridge, as described above, a membrane-like micromechanical member 30, being clamped at two or more corners, can be used. An example is given in FIG. 3. This membrane 30 is formed by appropriate structuring of a substrate 32 and covering layer 31. Underneath the membrane 30 there is an etch groove 33. The following equation can be used in case of a square membrane clamped at two corners to calculate the resonant frequency:

$$f \simeq f_0 \sqrt{1 + \frac{(\sigma_r + \sigma_\alpha)(1 - \nu^2)}{4.417 E} \left(\frac{a}{t}\right)^2} \quad (3)$$

where $f_0$ is the fundamental resonant frequency without in-plane stress, E is the Young's modulus, $\nu$ is Poisson's ratio. t is the membrane thickness, and a is the length of the side of the membrane. Further details are given in "Modulation of Micromachined-Microphone Frequency Response Using an On-Diaphragm Heater", R. P. Ried. et al.. DSC- Vol. 46, Micromechanical Systems, ASME (American Society of Mechanical Engineers) 1993, pp. 7–12.

All of the above elements, i.e. cantilevers, bridges and membranes are herein referred to as micromechanical members or micromechanical oscillators. The shape of the above micromechanical members can be optimized to match certain needs, e.g. by providing:

1. an additional proof mass at the end of the cantilever (extended end mass),
2. sections which are wider than others to increase sensitivity,
3. an appropriate cross-section, and so on.

It is interesting to note that the above bridges and membranes are well suited as detectors for high frequencies. The cantilevers can be folded, e.g. like a spiral, to obtain members being sensitive to low frequencies.

Arrays of Micromechanical Members

The above members can be arranged next to each other such that arrays of micromechanical members are obtained. A wide variety of combinations and arrangements are conceivable. The complexity of the array reflects the complexity of the signals to be processed. Highly sophisticated silicon technology and the well studied etching techniques lead realize the present realize the present devices. Such arrays can be made with high accuracy and reproducibility. When properly designing an array, it can be mass-produced at low cost and with high yield.

According to the present invention, the above micromechanical members and the resonant frequency of each such member needs to be chosen to obtain an element being sensitive to a certain frequency. In order to avoid resonant frequency shifts due to physical and chemical interactions of the micromechanical members with the surrounding environment, e.g. mass loading, dust, water adsorption, corrosion and so forth, it is advantageous to provide for an appropriate encapsulation of each of the micromechanical members or the whole array of members. Under certain circumstances it is recommended to place the micromechanical members in a housing which is evacuated. This does not only prevent contamination of the members, but also leads to a high mechanical quality factor. To achieve this, such a member might for example be placed in a microcavity. In certain cases it is important to prevent that a particular micromechanical member is directly acted upon by an external force caused by an acoustic signal, for example. There are different means which can be employed to prevent that a particular micromechanical member is stimulated in an undesirable manner. The respective micromechanical member may be rotated, e.g. by 90° such that it swings perpendicular to those members which are allowed to be stimulated by a force, such as an acoustic signal for example. The sensitivity as to acoustic signals, for example, can be reduced by reduction of the surface size which functions as target for the acoustic signal. Last but not least, a micromechanical member can be shielded or encapsulated in a housing. It is also possible to provide means for mechanical or electrostatic damping. Cantilevers exposed to an attractive electrostatic (or magnetic) force have the resonant frequencies lowered.

Depending on the design of the micromechanical member and the housing or cavity encapsulating said member, the mechanical quality factor Q can be lowered by introducing a gas (please note that the resonant frequency is in inverse proportion to Q, in first order). Stiffening of the micromechanical member leads to an increasing resonant frequency, whereas mass loading leads to a reduced resonant frequency. These effects can be used to fine-tune each of the micromechanical members. It is possible, for example, to place one or several members in a cavity which can be filled with an appropriate gas to achieve a damping effect. An array of micromechanical members might have several such cavities, each of which can either be evacuated, or filled with a gas. Normally, a gas pressure below 1mbar does not lead to a significant shift of the resonant frequency, however, it is to be noted that the actual effect depends on the size of the cavity or housing, the shape, material and other parameters of the micromechanical member, and on the kind of gas introduced.

Mass loading can also be used to shift the resonant frequency, e.g. to level out fabrication variations. The problem with mass loading is that mass can only be added but not easily removed. However, certain gases condense onto the oscillators (like water vapor). This adds mass. By heating them up, the gas (liquid) gets desorbed, i.e. the mass can be removed again. In a closed box this effect is reversible. Little droplets of a resin, or thin oxide layers can for example be used to provide for an additional load of a micromechanical member. It is envisaged that focussed ion milling allows to remove mass of a particular cantilever, but this is a very complex and expensive.

Linear and Non-Linear Coupling

According to the present invention, two or more micromechanical members have to be coupled in a linear and/or non-linear manner in order to achieve the desired mechanical p reprocessing and thus leading to an electronic circuitry of reduced complexity, as will be described later. By means of appropriate non-linear coupling of oscillators acoustic frequency detectors suited for detecting sound, noise, vowels, speech, voices and so forth, can be realized. In the following, we will concentrate on cantilevers, as for example illustrated in FIG. 1, for the sake of simplicity.

Figure 4:
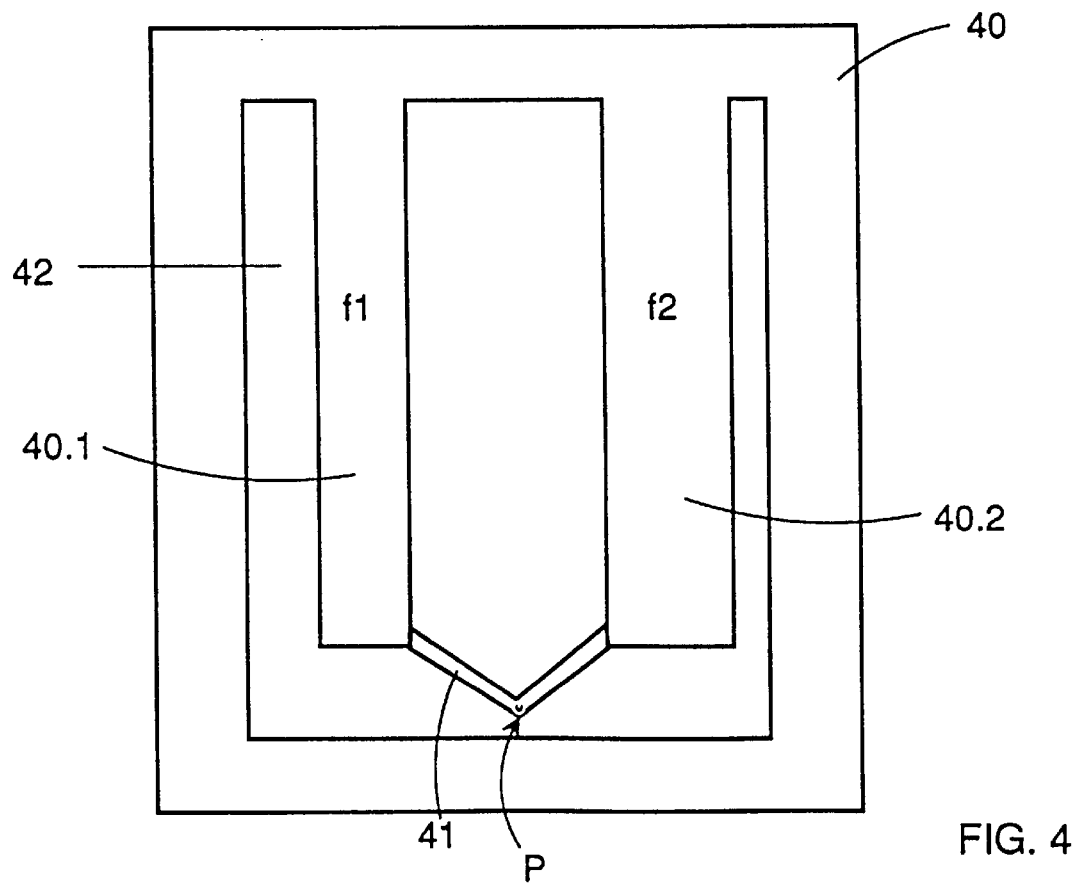
FIG. 4 is a schematic top view of a mechanical adder, in accordance with the present invention, serving as basic building block of different embodiments.

By means of two cantilevers 40.1 and 40.2 which are sensitive to a first frequency $f_1$ and a second frequency $f_2$, respectively, and being coupled by means of a linear coupling element 41, a mechanical adder, according to the present invention, can be realized. This adder is schematically illustrated in FIG. 4. The cantilevers 40.1 and 40.2 are formed in a substrate 40 and oscillate perpendicular to the surface of this substrate in a groove 42. Element 41 is a linear coupling element provided it is soft for stretching in the plane of the free ends of levers 40.1 and 40.2 but stiff against displacements out of this plane. It therefore, averages the out of plane displacements of 40.1 and 40.2 in point P.

There are different possibilities for non-linear coupling of micromechanical members. Non-linear coupling means: if the amplitude of the oscillation of one of the cantilevers is enhanced by a factor x, the amplitude of the force acting on the second cantilever is enhanced by a factor $y \neq x$. Non-linear coupling elements are described in the following:

1. Micromechanical members 60.1, 60.2, and 62 which all oscillate perpendicular to the plane shown in FIG. 5A can be mechanically coupled by means of spring-like elements, e.g. thin and flexible bridges made of the same material and fabricated together with the micromechanical members. Element 64 is a linear coupling element, as already described in connection with FIG. 4, provided it is soft for stretching in the plane of the free ends of levers 60.1 and 60.2 but stiff against displacements out of this plane. It, therefore, averages the out of plane displacements of 60.1 and 60.2 in point P. The non-linear coupling element 66, on the other hand, is soft for displacements out of the plane, like a string. It is stretched with the cosine of its out of plane angle and its out of plane force component which excites the cantilever 62 is proportional to the sine. The coupling is therefore predominantly cubic.

Figure 5A:
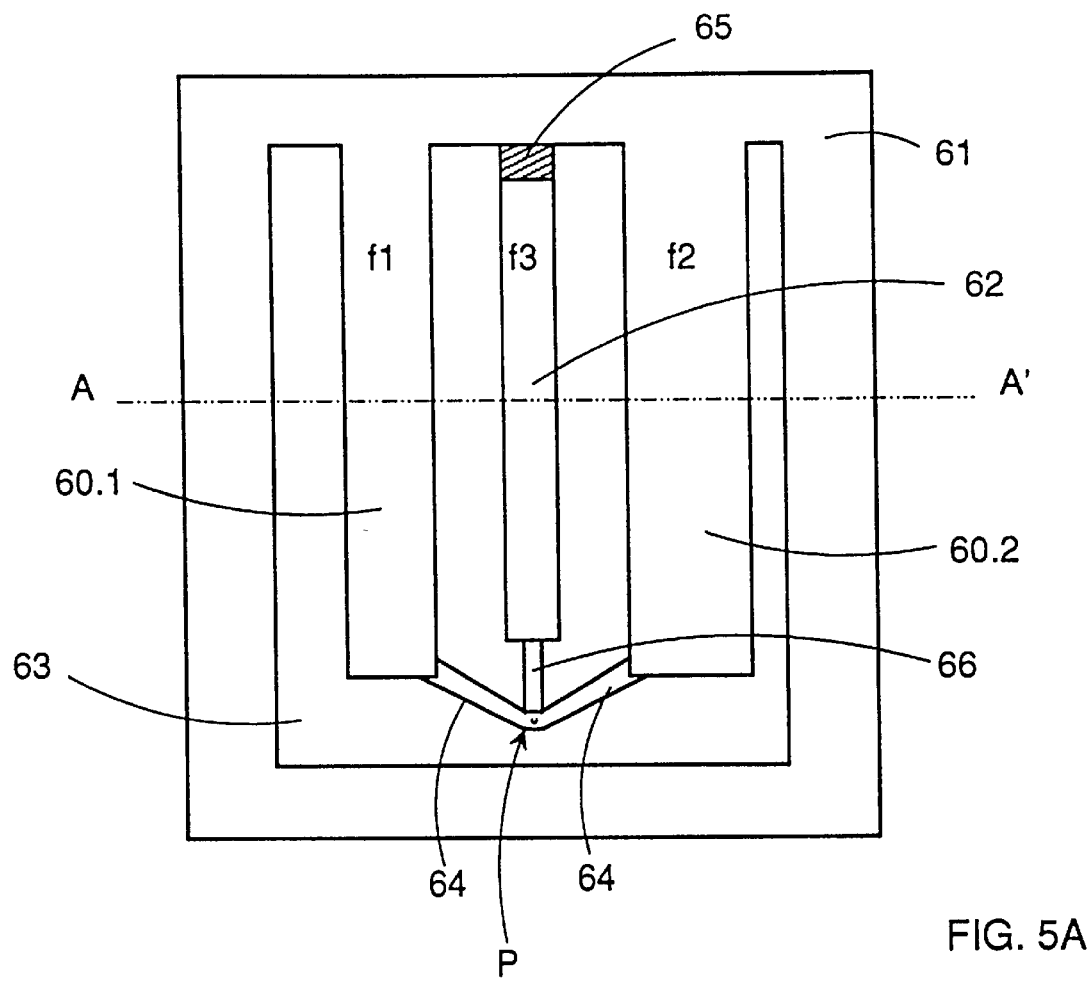
FIG. 5A is a schematic top view of a mechanical AND-gate, in accordance with the present invention, serving as basic building block of different embodiments.
Figure 5B:
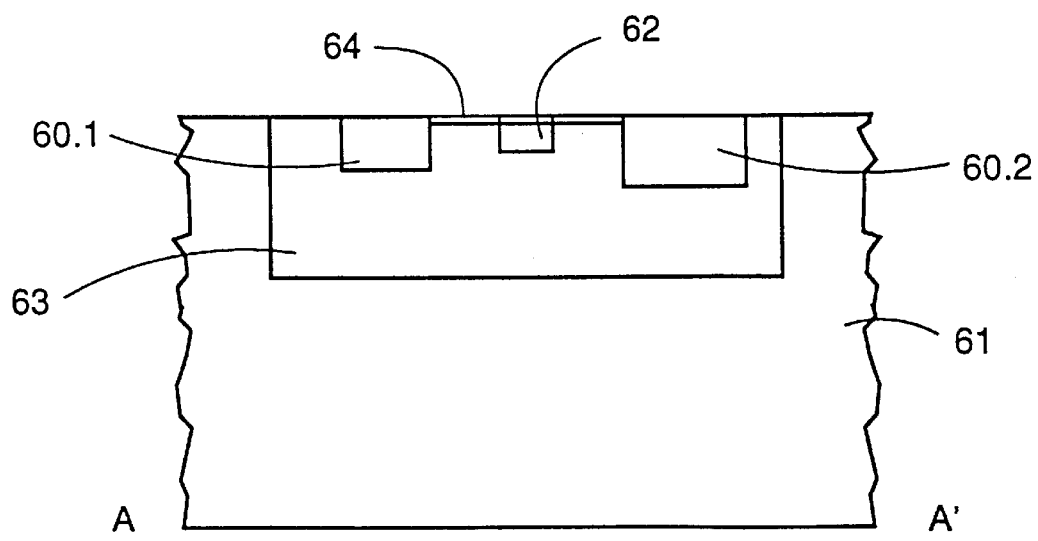
FIG. 5B is a schematic cross-section of the AND-gate of FIG. 5A.
Figure 5C:
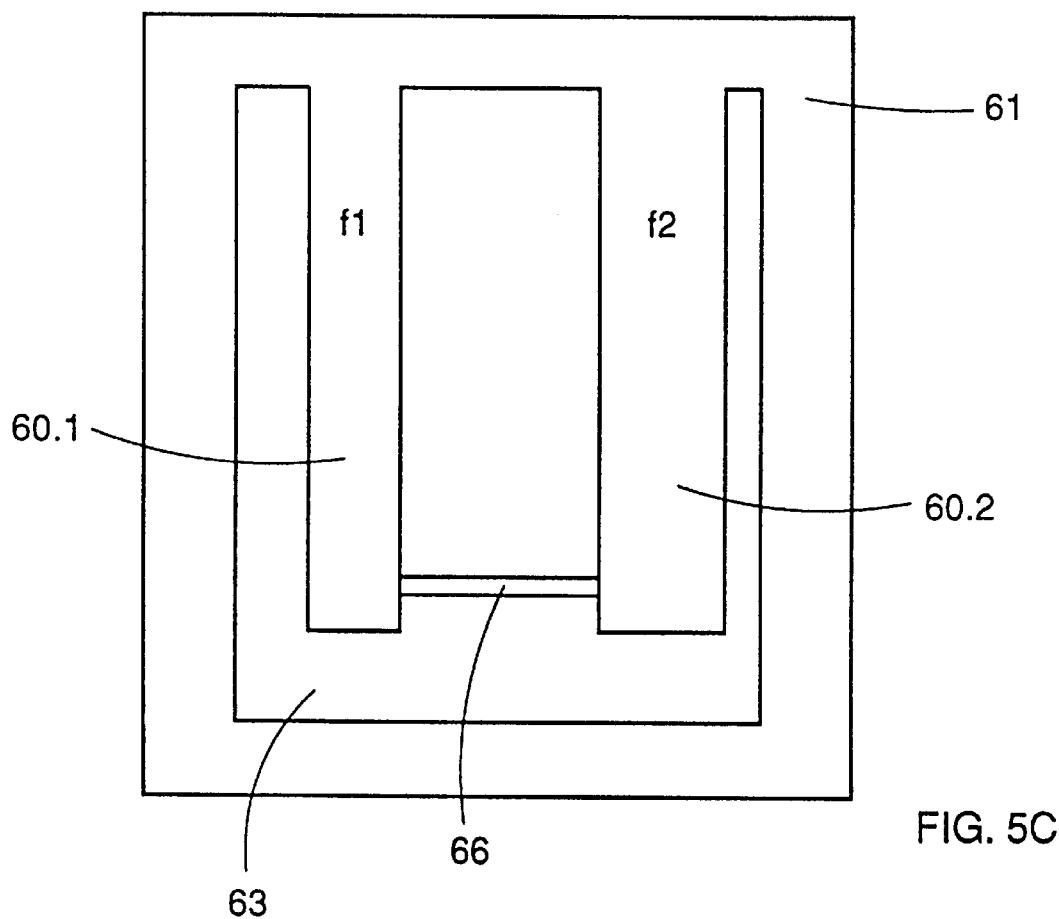
FIG. 5C is a schematic top view of another cantilever arrangement coupled by means of a non-linear coupling element.

Likewise, the coupling between the oscillators 60.1 and 60.2 in FIG. 5C is cubic, i.e. the stiffness of the non-linear coupling element 66 increases with the amplitude squared.

2. Non-linear coupling can, for example, also be achieved by means of a fluid with high viscosity surrounding the micromechanical members. The etch groove (cavity) underneath the micromechanical members might be designed such that it provides a container for a fluid, the members being placed in this groove such that they are partially or totally enclosed by the fluid. Furthermore, the gap needs to be designed such that the fluid provides for an interaction between the two cantilevers.

3. Likewise, a narrow gap, filled with a suited gas, between two micromechanical members can be employed as non-linear coupling element.

4. One can make use of electrostatic non-linear coupling elements. By providing the micromechanical members with appropriate electrodes, the force induced when applying a voltage between these electrodes leads to a non-linear coupling of the respective members. One advantage of t his approach is that the coupling efficiency, i.e. the spring constant, can be adjusted by varying the voltage applied.

5. Any other means that can be used to couple micromechanical members in a non-linear manner are suited as well. It is clear that any combinations of the above can also be used.

The linear as well as non-linear coupling elements, according to the present invention, may be formed together with the oscillators. Likewise, one might utilize coupling elements of a material other than those of the oscillators which are solder bonded to the oscillators, for example.

Detectors

Eventhough most of the processing of signals, e.g. acoustic signals, is done mechanically (mechanical preprocessing), according to the present invention, a detection of the movement of some of the micromechanical members, followed by a conversion into electrical signals, is required. In the following, some detectors are described which are suited for oscillation detection and conversion into electrical signals.

We hereinafter concentrate on the detectors as such, being suited for detecting the movement of a micromechanical member. Different such detectors are known in the art.

A first group of detecting methods is based on the well known piezoelectric or piezoresistive effect. An example is described by M. Tortonese et al. in Applied Physics Letters, Vol. 62, No. 8, pp. 834–836, 1993. These methods provide detection schemes in which the deflection detector is integrated in the non-linear coup led micromechanical member. This facilitates kind of a self-detecting, micromechanical oscillation detector.

The displacement of the micromechanical members can also be measured by applying optical methods, such as beam deflection or interferometry. The beam deflection method makes use of the length of the micromechanical member, e.g. a cantilever. Usually, a light beam, preferably produced by a laser diode or guided through an optical fiber, is directed onto the micromechanical member. A small deflection of the member causes a reasonable change in the reflecting angle and, therefore, results in a deflection of the reflected light beam that is measured with a bicell or another suitable monitor element, e.g. a photodiode. The beam deflection method is simple and reliable. Commercially available elements can be used to realize such detectors. Interferometric methods are described, for example, by Martin et al. in Journal of Applied Physics, Vol. 61, p. 4723, 1987, by Sarid et al. in Opt. Lett., Vol. 12, p. 1057, 1988, and by Oshio et al. in Ultramicroscopy, 42–44, pp. 310–314, 1992. Instead of using a light beam directed via a fiber onto the coupled members, one could provide coupled members with an integrated waveguide structure. A light wave fed through this waveguide structure exits the waveguide at one end and is thus detectable by a monitor element. An example of a waveguide integrated into a cantilever is given in "Micromechanical cantilever resonator with integrated optical interrogation", M. Hoffmann et al., Sensors and Actuators, Vol. A 44, pp. 71–75, 1994. As pointed out in this article, an array of cantilevers can be f ed by one light source if an optical branching structure is employed.

Yet another feasible way of detecting the displacement of the micromechanical members relies on capacitance sensing and is known, for example, from Joyce et al., Rev. Sci. Instr., Vol. 62, p. 710, 1991, and Göddenhenrich et al., Journal of Vacuum Fci. Technol., Vol. A8, p. 383, 1990. The mutually facing surfaces of a micromechanical member and cavity may be coated with thin met al layers , e .g. gold, forming a capacitance. A voltage source is connected to this capacitance. If one connects this capa citanc e to an amplifier followed by a discriminator one obtains a very sensitive detector.

It is also possible to employ a superconducting quantum interference device (SQUID) for movement detection of cantilevers, as described in U.S. Pat. No. 5,166,612.

It is likewise possible, to detect the oscillation of a cantilever by means of a field effect transistor (FET) whose gate electrode moves if the cantilever oscillates such that a current flows through the FET generating an output signal. An example is given in U.S. Pat. No. 5,103,279.

The above detectors require a signal processing circuitry, as for example already indicated in connection with the capacitive detection approach, to process the signal output by the detector as such.

Signal Processing Circuitry

The simplest signal processing circuitry. consists of an operational amplifier serving as a comperator and being arranged such that an output signal (also referred to as decision because this output signal carries information as to whether a particular sound, vowel or the like was detected) is provided if a certain threshold at its input is exceeded. The simpler the signal processing circuitry is, the easier it can be monolithically integrated into the substrate carrying the micromechanical members and detectors.

Interface Electronics

In addition to the above elements, other circuits are required if the acoustic frequency detector of the present invention is to be connected to a computer or telephone system, for example. The circuitry which is needed to connect the present acoustic detector to other systems and devices is herein referred to as interface electronics. The interface electronics can also be integrated on the same substrate as the acoustic detector. Such a circuitry might include a microprocessor, multiplexer/demultiplexer, parallel-to-serial converter and serial-to-parallel converter, analog/digital conversion circuits and so forth. Of particular importance are means for analog-to-digital conversion if the acoustic frequency detector is tcl be connected to a computer. For some applications it is advisable to employ a microprocessor which coordinates all activities of the acoustic frequency detector.

Logic 'AND' Function

It is crucial for the present invention that mechanically preprocessed information is output as decision. This speeds up the processing and reduces the complexity of the electronic circuitry needed for further processing.

A logic AND function (AND-gate) can be realized by means of a device comprising three cantilevers, as illustrated in FIGS. 5A and 5B, the first one 60.1 with first resonant frequency $f_1$, the second one 60.2 with a second resonant frequency $f_2$, and the third one 62 with an appropriate third resonant frequency $f_3$. The linear coupling element 64 averages the excursion $a_1\sin(f_1 t)$ of lever 60.1 and $a_2\sin(f_2 t)$ of lever 60.2 in point P which then oscillates with $\frac{1}{2}[a_1\sin(f_1 t)+a_2\sin(f_2 t)]$. The non-linear coupling to cantilever 62—achieved by non-linear coupling element 66—produces force terms at lever 62 with frequencies $f_3$, which are higher harmonics of $f_1$ or $f_2$, or combinations of $f_1$ and $f_2$ and their higher harmonics. Only the combinations are of interest for an AND-gate. because their force term amplitudes are mixed products of both original amplitudes $a_1$ and $a_2$, respectively. Such modes of lever 62 are, therefore, only excited if both levers 60.1 and 60.2 are excited.

For a quadratic coupling we have $f_3=|f_1\pm f_2|$ both with an amplitude proportional to $a_1 a_2$: a cubic coupling gives $f_3=2f_1\pm f_2$ with the amplitude being proportional to $a_1^2 a_2$ and $f_3=2f_2\pm f_1$ with the amplitude being proportional to $a_1 a_2^2$; a forth order term yields $f_3=3f_1\pm f_2$ with the amplitude being proportional to $a_1^3 a_2$, $f_3=2(f_1\pm f_2)$ with the amplitude being proportional to $a_1^2 a_2^2$, $f_3=3f_2\pm f_1$ with the amplitude being proportional to $a_1 a_2^3$; and $f_3=(f_1\pm f_2)$ with the amplitude being proportional to $a_1 a_2(a_1^2+a_2^2)$; and so on. Please note that the non-linear terms in the amplitudes can be used advantageously toward threshold detection.

So far a micromechanical adder (FIG. 4) and a mechanical AND-gate (FIGS. 5A and 5B) have been described. It is immediately obvious, that there are several different ways to implement such adders and AND-gates and that those schematically illustrated so far are just examples. By means of a mechanical AND-gate, or a combination of several AND-gates and adders, a signal can be mechanically processed and analyzed as to whether certain frequencies or combinations of frequencies are comprised.

Next, we consider another building block, namely a mechanical OR-gate. A simple implementation is schematically illustrated in FIG. 6. An auxiliary cantilever 60.4 stimulated by an actuator 50 and oscillating at the frequency $f_4$ is added to levers 60.1 and 60.2 such that the point P4 oscillates with $a_1\sin(f_1 t)+a_2\sin(f_2 t)+a_4\sin(f_4 t)$. The non-linearly coupled cantilever contains the frequencies $f_3$ which are combinations of $(f_1, f_4)$, $(f_2, f_4)$ and $(f_1, f_2)$. If $f_4$ is chosen such that a different combination of $(f_1, f_4)$ and $(f_2, f_4)$ respectively give the same frequency $f_3$, then the beam 62 is excited when either beam 60.1 or 60.2 oscillates. For a quadratic non-linear coupling element 66 in FIG. 6 one would choose $f_1-f_4=f_2+f_4=f_3$ thus $f_3=\frac{1}{2}(f_1+f_2)$ and $f_4=\frac{1}{2}(f_1-f_2)$. The quadratic non-linear coupling element 66 gives the two force terms with frequencies $f_3$ at 62, namely $a_1 a_4\sin(f_1-f_4)$ and $a_2 a_4\sin(f_2+f_4)$.

Figure 7:
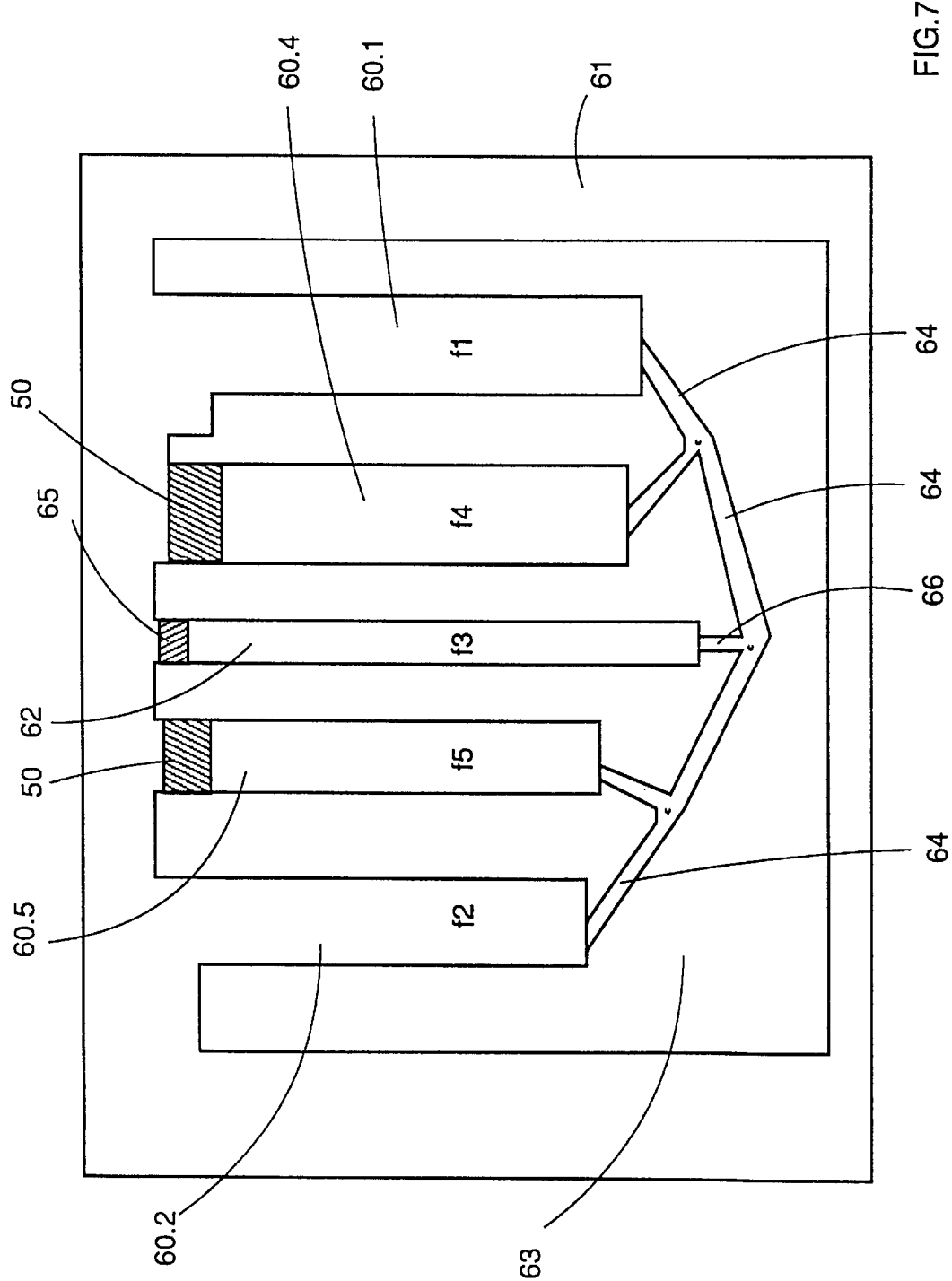
FIG. 7 is a schematic top view of another mechanical OR-gate, in accordance with the present invention, serving as basic building block of different embodiments.

If the frequencies $f_1$ and $f_2$ are very close, then $f_4$ might be too small for practical implementation. This calls for another kind of OR-gate, as illustrated in FIG. 7. As shown in this Figure, it is advantageous to employ two auxiliary cantilevers 60.4 and 60.5 with frequencies $f_4$ and $f_5$, respectively, such that $f_1+f_4=f_2+f_5=f_3$. The two auxiliary cantilevers 60.4 and 60.5 are equipped with actuators 50 used to excite the oscillation with frequencies $f_4$ and $f_5$, respectively.

Figure 8A:
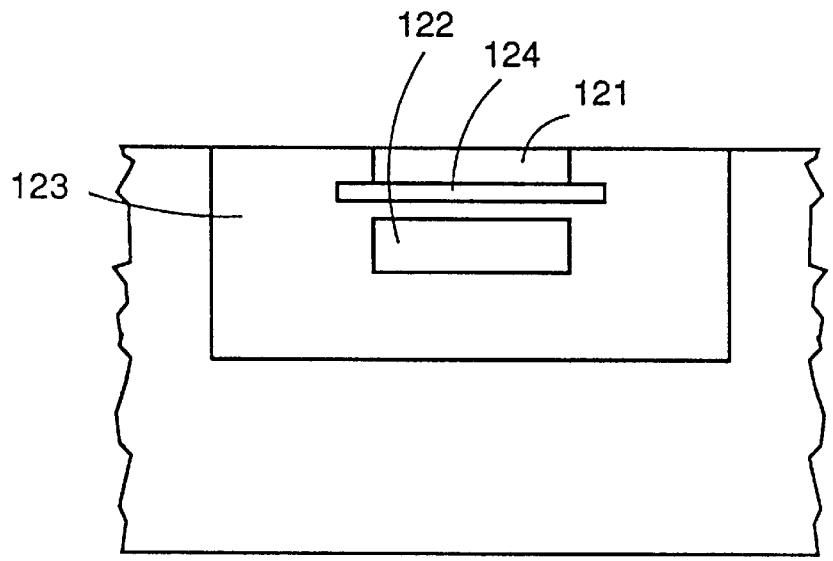
FIG. 8A is a schematic cross-section of a mechanical threshold detector, in accordance with the present invention.
Figure 8B:
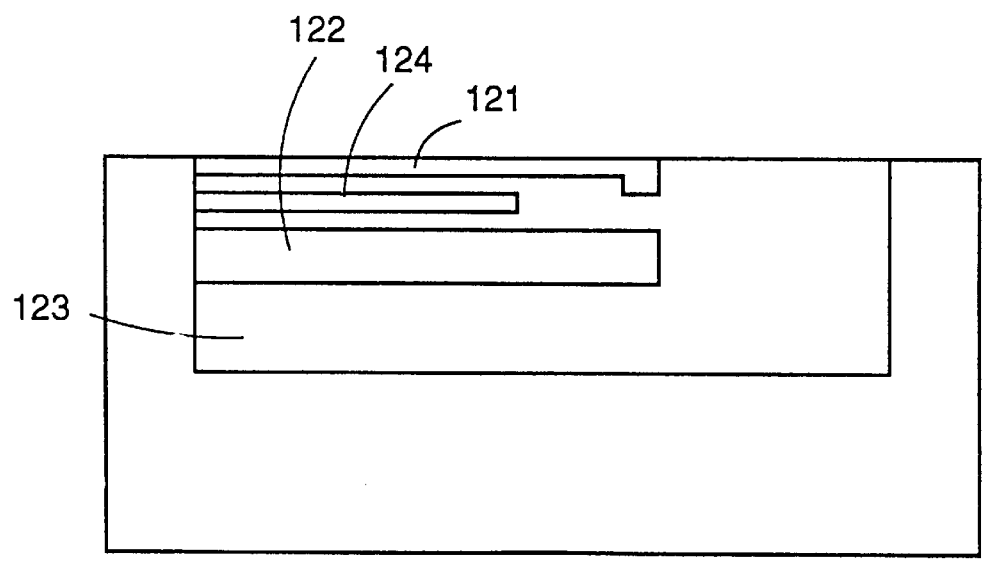
FIG. 8B is a schematic cross-section of the threshold detector of FIG. 8A.

Another element being important for the mechanical analysis of a signal, referred to as threshold detector, is illustrated by cross-sectional views in FIGS. 8A and 8B. For the analysis of an acoustic signal, for example, it may be important to take into account only signals exceeding a certain amplitude (volume). The threshold detector of FIGS. 8A and 8B, employs two cantilevers 121 and 122, or like micromechanical members, being arranged such that the first cantilever 121 is put into motion by an external force (acoustic signal) with frequency $f_1$. If this signal exceeds a certain amplitude the second cantilever 122 is mechanically stimulated by the first one knocking against it. The second cantilever 122 has a resonant frequency similar to $f_1$ and its oscillation can be detected. The two cantilevers 121 and 122 have to be arranged such that only the first one is directly acted upon by the external force (acoustic signal). This means that the second cantilever 122 may be placed underneath the first one in a groove 123, for example. To further prevent it from being stimulated directly, it may be shielded by a plate like member 124.

Another way to achieve threshold action is to use higher order coupling as mentioned above in the context with the logic 'AND' function. In the case of forth order coupling detecting at $3f_1\pm f_2$ is a threshold detection for $f_1$ since the amplitude of $3f_1\pm f_2$ is proportional to $a_1^3 a_2$. Detecting, on the other hand, a $3f_2\pm f_1$ with amplitude proportional to $a_2^3 a_1$ is a threshold detection of $f_2$. In the former case, $f_2$ can also be produced by an auxiliary oscillator, as can be $f_1$ in the latter case.

Still another basic element of the present invention concerns shift to high frequency. Since micromechanical members are particularly well suited for the detection of high frequencies, it may be desirable or necessary to shift a signal of low frequency to higher frequencies for better mechanical processing. This can be done by means of a high frequency auxiliary cantilever with frequency $f_1$ say 10 kHz, which is linearly coupled to the low frequency mechanical member at $f_2$. Now $f_1+f_2$ can, for example, easily be AND-coupled with another (acoustic) signal having a frequency $f_3$ (e.g. 11 kHz) in the range of $f_1$. For some applications it is important to slightly shift the superposition $f_1+f_2$. This can be achieved by wobbling frequency $f_1$ from $f_1-\Delta f_1$ to $f_1+\Delta f_1$. Usually, such an auxiliary cantilever (also referred to as micromechanical resonator) can be tuned only a few percent, i.e. $\Delta f_1 \ll f_1$.

Tuning of the resonance frequency can be achieved by means of an electrothermical effect, i.e. making use of the thermal expansion induced by on-diaphragm, polysilicon heaters, as for example reported in "Modulation of Micromachined-Microphone Frequency Response Using an on-Diaphragm Heater" R. P. Ried et al., DSC-Vol. 46, Micromechanical Systems, ASME 1993, pp. 7–12.

Figure 9:
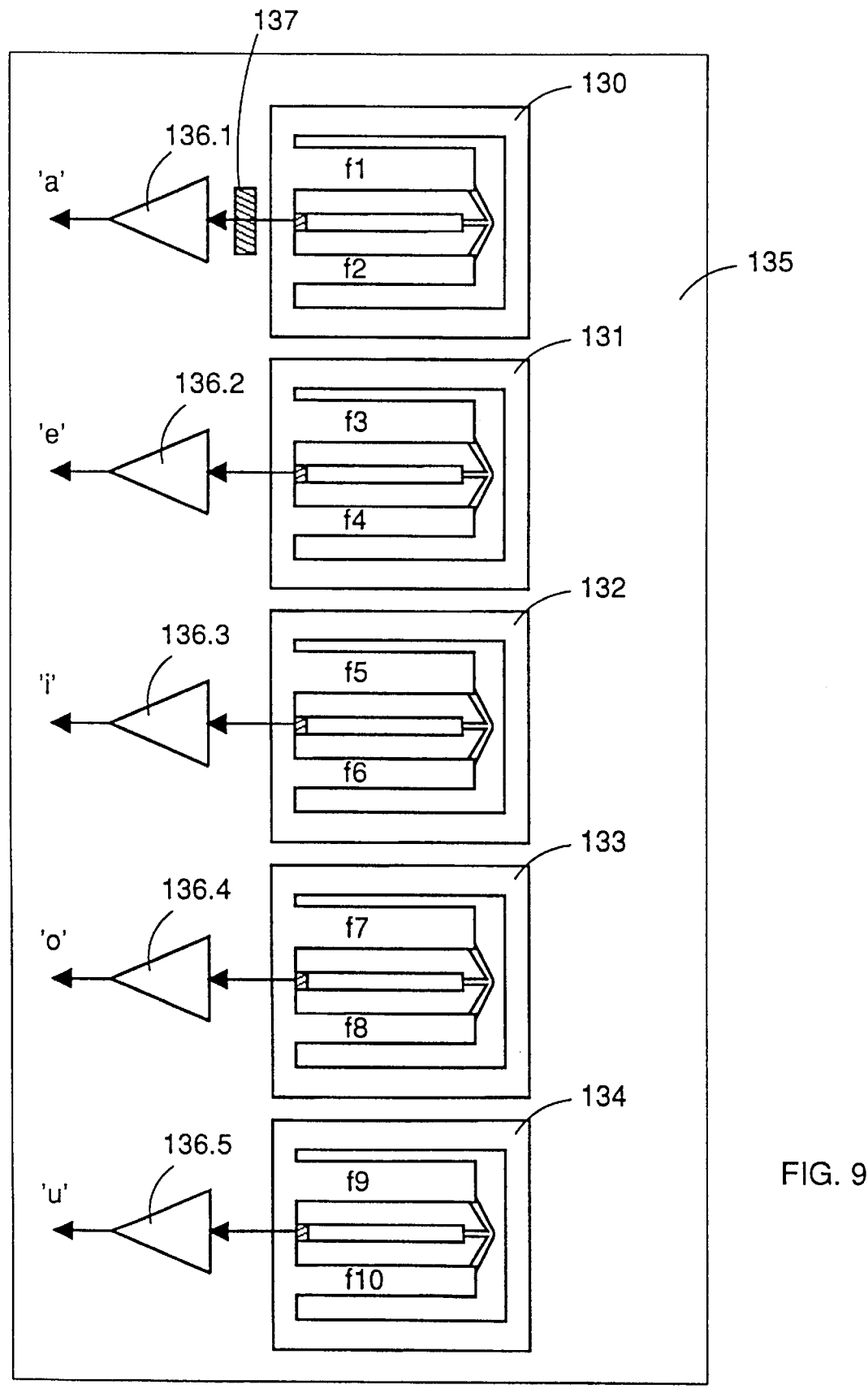
FIG. 9 is a schematic top view of an acoustic detector for the detection of vowels, in accordance with the present invention.

A vowel detection system, according to the present invention, is described in the following. Current investigations of the pronunciation of vowels revealed that each vowel has a characteristic frequency spectrum. Different vowels can be easily determined by detection of certain frequencies or combinations thereof. If one now assumes that an 'a' mainly comprises of peaks at frequencies $f_1$ and $f_2$, whereas an 'i' is characterized by $f_3$ and $f_4$. one can realize a vowel detection system by means of the basic building blocks described hereinabove. The same holds for all other vowels. A vowel detection system 135, which allows to mechanically determine different vowels 'a', 'e', 'i', 'o', and 'u', is schematically illustrated in FIG. 9. It comprises five acousto-mechanical AND-gates 130 through 134 each one being specifically designed for the detection of one particular vowel. A simple signal processing circuitry, consisting of operational amplifiers 136.1–136.5, is provided. A signal is made available at the output of amplifier 136.2 if the acoustic signal to be analyzed comprises an 'e', for example. The acoustic detector 135 might further comprise threshold detectors 137 as schematically indicated in FIG. 9. Such a threshold detector might either be a mechanical or electrical one.

The vowel detection system 135 can be further improved by adding additional building blocks. The more frequencies are observed and analyzed, the more precise a particular vowel can be detected. Any combination of the present AND-gates and OR-gates can be employed to improve the detection. The amplitudes of the characterizing frequency spectrum can be used to obtain additional information and to further improve the detection of vowels. A threshold detector, as described above, may be employed to achieve this. The vowel detection system 135 may be used in connection with conventional speech recognition systems. It is well suited to provide such a conventional recognition system with additional information (decisions) which may be used to reduce the number of wrong decisions. The present vowel detection system 135 is also suited as means for handicapped people to cause electric devices to operate when a vowel is vocalized. By issuing simple commands, in form of vowels, different apparatus can be controlled and steered. It is clear that there are many other applications for a vowel detection system as described hereinabove.

In order to realize a complete speech recognition systemn, the system of FIG. 9 has to be further extended. An array of one-hundred micromechanical cantilevers arranged as AND-gates. OR-gates, and threshold detectors, for example, already leads to good recognition of syllables or even whole words. If space permits, there is almost no limitation to the number of cantilevers used in such a detector. Such a detector may have several parallel output lines. On these output lines a sequence of signals (decisions) appear if an acoustic signal is detected and mechanically processed.

The present detectors facilitate new speech recognition systems being different from what is known so far. Since the detector provides preprocessed signals, i.e., decisions as to whether a particular vowel, consonant, syllable, or word has been recognized, the analysis, segmentation, and comparison of incoming signals with signals stored in a knowledge base can be simplified or even omitted. Such a new speech recognition system may for example use the decisions received from thee detector to improve the recognition rate in that—in addition to the probabilistic methods of known systems—decisions are weighted based on the decisions or decision pattern received form the detector. This leads to a more reliable recognition of syllables or words. The interaction of a conventional speech recognition system with the present acoustic detector followed by an appropriate signal processing circuitry can be used for automatic detection and correction of errors in the conventional speech recognition system.

A completely new speech recognition system relies solely on the decisions (decision pattern) output via parallel output lines of a detector, according to the present invention. These decisions may be compared with a pattern of decisions stored in a knowledge base. If a matching decision pattern was found in this knowledge base, the corresponding syllable or word may be retrieved and returned for further processing. Most of this processing can be carried out by digital circuits and the processing time is relatively short. Known pattern recognition methods for searching the knowledge base can be used to improve the reliability of such a new speech recognition system. The knowledge base of such a new system can be much smaller than the one of a conventional speech recognition system.

Figure 10A:
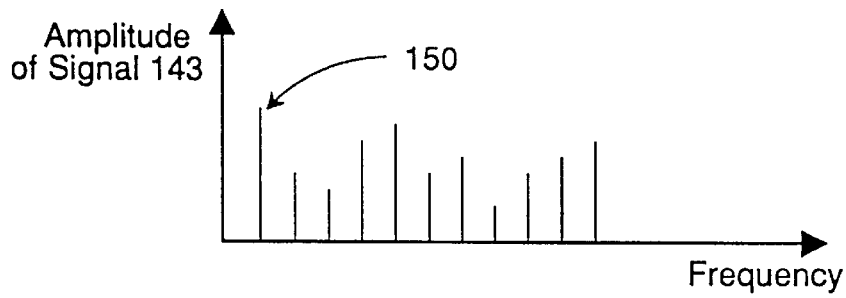
FIGS. 10A–10B are diagrams schematically illustrating the frequency spectrum of the acoustic signal at the input side of the acoustic detector assembly in FIG. 11, and the acoustic signal at the output of the loudspeaker thereof.

A typical frequency spectrum of a human voice is shown in FIG. 10A. As can be seen from the example, there is a base frequency 150 followed by several peaks at higher frequencies. These peaks are usually about 100 Hz apart. The frequency pattern shown in FIG. 10A might, for example, represent an 'a'. According to the present invention, one might now design an acoustic detector having several cantilevers being sensitive to some or all of the frequency peaks shown in FIG. 10A. The problem is that the frequency range of human voice is usually between a few Hz and a few kHz. This would lead to relatively long cantilevers, or cantilevers of very special shape designed to cope with such low frequencies.

Figure 10B:
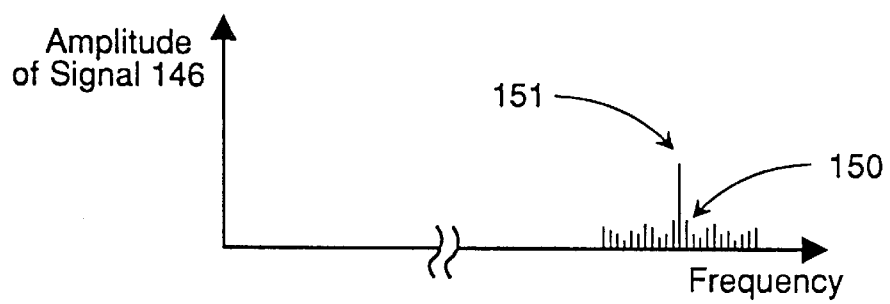
Figure 11:
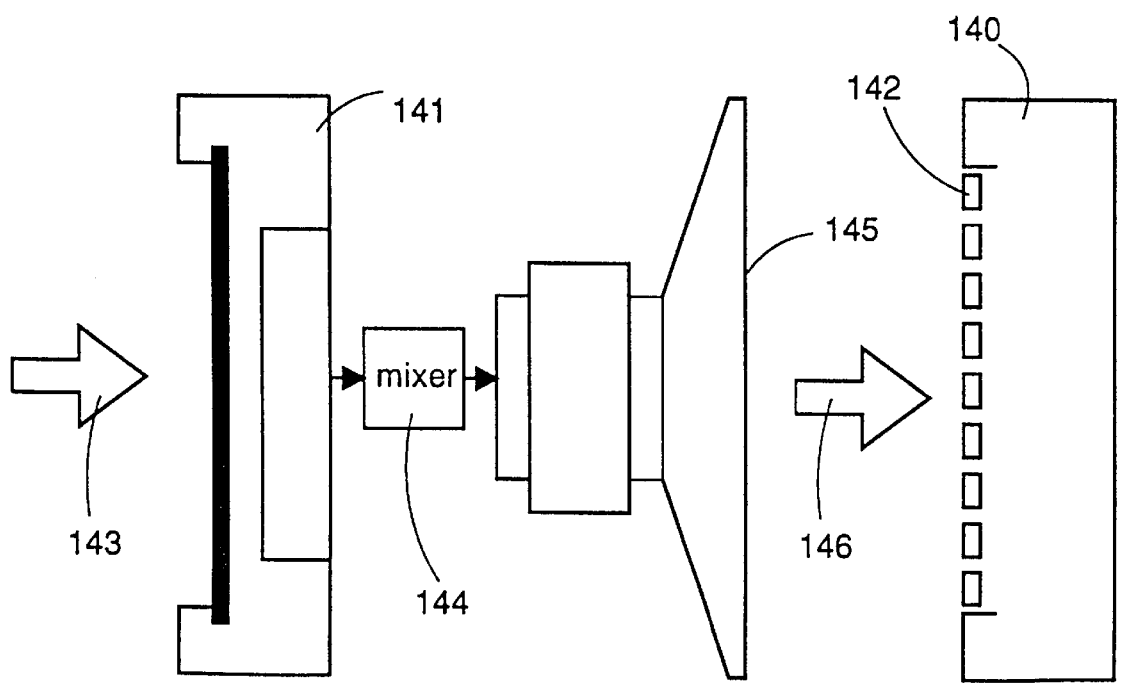
FIG. 11 is a schematic view of an acoustic detector assembly with means for frequency shifting, in accordance with the present invention.

In the following, another embodiment of the present invention is described in connection with FIG. 11. If one wants to employ smaller and shorter cantilevers, which are consequentially sensitive to higher frequencies than longer ones, one has to shift the incoming acoustic signals, e.g. the human voice, towards higher frequencies. As illustrated in FIG. 11, this can, for example, be achieved by means of a microphone 141. mixer 144, and loudspeaker 145. An incoming acoustic signal 143 is converted into electric signals by said microphone 141. The output of the microphone 141 is modulated or mixed with a carrier signal 151 of higher frequency, e.g. 10 kHz. The loudspeaker 145 generates another signal 146. This signal 146 has a frequency spectrum as shown in FIG. 10B. The carrier frequency 151 is chosen to perfectly match the frequency characteristic of an acoustic detector 140, according to the present invention. The cantilevers 142 of this detector 140 may now be much shorter than those of a detector being designed for directly operating on the human voice. Since the frequency peaks of a human voice are about 100 Hz apart, a frequency resolution (selectivity) of 100 Hz is required. Todays microfabrication technologies allow to make cantilever arrays with such a selectivity (quality factor of about 100). The elements of FIG. 11 can be easily integrated into a small housing which in turn might be employed in a microphone assembly or in a hearing aid.

The principle described in connection with FIG. 11 can also be used for the mechanical processing of electric signal. Such an electric signal needs to be either transformed into an acoustic signal, e.g. by means of a loudspeaker 145, before it is applied to a detector 140, or it can likewise be mechanically coupled onto to the detector 140. Mechanical coupling can for example be achieved by a rigid stamp interacting with the detector 140.

Figure 12:
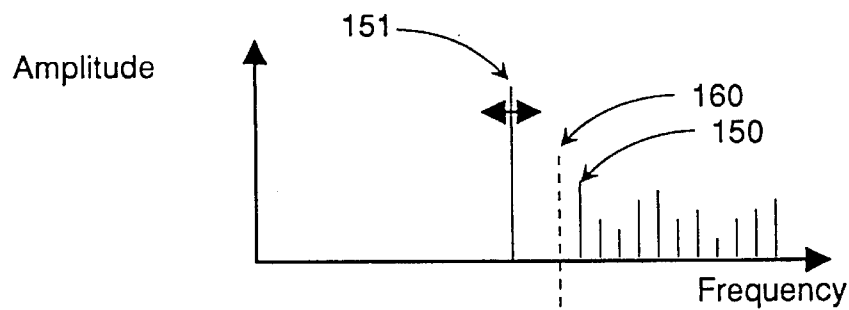
FIG. 12 is a diagram schematically illustrating the possibility to shift the frequency spectrum in order to achieve optimum adaptation of an acoustic detector, in accordance with the present invention.

In order to adapt an acoustic detector to a new user (speaker), it might be necessary to shift the base frequency 150 towards higher and/or lower frequencies until the peak sensitivity 160 of a first cantilever is hit. In case of an acoustic detector, as illustrated in FIG. 11, this can be achieved by variation of the carrier frequency 151, as illustrated in FIG. 12. The adaptation can be controlled in a feedback fashion such that, once the base frequency 150 mixed with said carrier frequency 151 matches the peak sensitivity 160 of the first cantilever, the optimum carrier frequency is locked. This can, for example, be done in a training sequence, the result of which may be stored in a random access memory (RAM). The acoustic detector can thus be programmed for different speakers and may be manually or automatically switched.

Figure 13:
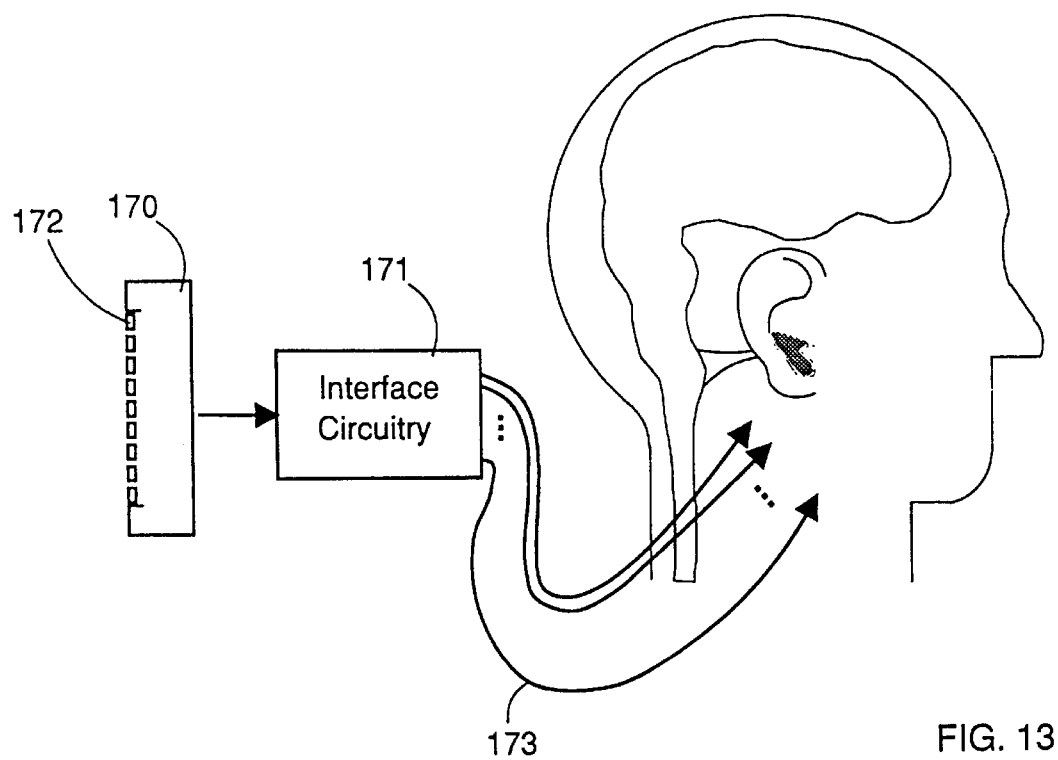
FIG. 13 is a schematic view of a hearing aid comprising an acoustic detector, in accordance with the present invention.

In the following. another embodiment of the present invention will be described. The present invention can also be used to improve known hearing aids. An example of a hearing aid for implantation into the human ear is illustrated in FIG. 13. As can be seen from this Figure, there is an acoustic detector 170 with cantilevers 172, according to the present invention, being used for mechanically preprocessing incoming acoustic signals 174. This detector 170 is connected to an interface circuitry 171. This circuitry 171 analyzes the signals received from the detector 170. It may, for example, take into account special parameters stored in a random access memory (RAM). An example of such a parameter is the carrier frequency which leads to an optimum adaptation of the detector to a certain speaker. as explained hereinabove. It may further comprise filters and amplifiers to obtain an optimum signal spectrum. At the output side this interface circuitry 171 comprises driving means for feeding appropriate signals to a set of electrodes 173. Each such electrode 173 is implanted into the human ear 175 so as to interact with the hearing nerves 176. By means of the signals fed into these electrodes 173, the hearing nervessuch that a stimulus pattersuch that a stimulus pattern is realized in the ear. forwarded by the nerves to the brain 177 where it is analyzed and assigned to a sound, syllable, or word. The more electrodes are used. the better the hearing aids replaces the fully functional human ear. Experiments revealed that quite some training is required to get used to such a hearing aids. Means for fine-uning the interface circuitry are helpful for adapting the signals, for reduction of the background noise, and for modifying the filter characteristics, just to name some parameters which may be adjusted.

The present acoustic detectors may also be combined with conventional microphones or hearing aids so as to facilitate improved detection of certain sounds, e.g. an alarm signal, or for improved recognition of vowels, consonants, syllables, or words. By means of the mechanical preprocessing, achieved by the present detectors, the processing unit of a speech recognition system, for example, is off-loaded.

The above adder, AND-gate, OR-gate, and threshold detectors can be used to realize a noise eliminator. Such a noise elmiminator may for example comprise an acoustic detectors designed to detect a particular sound. In noisy environment, e.g. in a cockpit, it would then be useful to reduce or eliminate this particular sound so as to ensure that voice and other signals can be better understood. The electric output signal of the acoustic detector is then amplified and phase-shifted before being converted back into acoustic signals by means of a set of loudspeakers. The superposition of the original sound and the phase-shifted sound leads to a reduction in the overall noise level.

Any of the above mechanical signal processing systems and acoustic detectors may be realized with on-chip (large-scale-integrated CMOS; LSI CMOS, for example) electronics. This leads to reduced parasitic capacitance, reduced size, and improved reliability, just to name some of the advantages.

The present detectors may either be designed such that they can be used by several speakers, or they may be specifically designed or fine-tuned so as to match the characterizing frequency spectrum of one particular speaker leading to personalized systems. A detector specially adapted to be operated by one speaker can be used in various ways. Imagine, for example, a mobile telephone that works only when it recognizes its owner's voice, or a telephone inquiry service that relies entirely on a computer to handle its calls. These developments are possible thanks to advances in speech recognition technology and in particular by such systems cooperating/interacting with an acoustic detector, according to the present invention.

What is claimed is:

1. Mechanical signal processing system, comprising:

a first micromechanical member (60.1) being sensitive to a first frequency ($f_1$), a second micromechanical member (60.2) being sensitive to a second frequency ($f_2$), and a third micromechanical member (62), provided with an oscillation detector (65), said first and second micromechanical members (60.1, 60.2) being couple via linear coupling means (64) arranged such that said linear coupling means (64) is stimulated so as to oscillate with a superposition of said frequencies ($f_1$, $f_2$) if said first micromechanical member (60.1) is acted upon by a force or acoustic signal of said first frequency ($f_1$) and said second micromechanical member (60.2) is acted upon by a force or acoustic signal of said second frequency ($f_2$), said third micromechanical member (62) being coupled via non-linear coupling means (66) to said linear coupling means (64) such that said third micromechanical member (62) is stimulated in a non-linear manner and oscillates if a particular oscillation component corresponding thereto is present in said superposition, said particular oscillation component being detectable by said oscillation detector (65).

2. The processing system of claim 1, wherein said third micromechanical member (62) is sensitive to a third frequency ($f_3$) such that said micromechanical member (62) oscillates if said third frequency ($f_3$) is present.

3. The processing system of claim 2, wherein said non-linear coupling means is a thin bridge having a non-linear spring constant.

4. The processing system of claim 2, wherein said non-linear coupling means comprises opposing electrodes for applying a voltage leading to attractive, non-linear forces.

5. The processing system of claim 2, wherein said third frequency ($f_3$) approximately matches the oscillation frequency of said linear coupling means, said third frequency corresponding to said first frequency and second frequency.

6. The processing system of claim 2, wherein said oscillation detector detects oscillation based on a piezoelectric effect.

7. The processing system of claim 2, wherein said oscillation detector comprises means for capacitive sensing of the oscillation.

8. The processing system of claim 2, wherein said oscillation detector comprises means for optical oscillation detection.

9. The processing system of claim 1, wherein said processing systen processes acoustic signals including said first frequency ($f_1$) and said second frequency.

10. The processing system of claim 1, comprising at least one of signal processing circuitry and interface circuitry for interaction with a computer.

11. The processing system of claim 1, comprising means for adjusting the sensitivity as to a certain frequency of at least one of said first, second, and third micromechanical members, and said linear and non-linear coupling means.

12. The processing system of claim 9, comprising a micromechanical threshold detector being coupled to at least one of said first, second, and third micromechanical members such that said at least one of said first, second, and third micromechanical members is only stimulated if the intensity of said acoustic signal exceeds a certain threshold.

13. The processing system of claim 9, comprising a micromechanical resonator oscillating at a carrier frequency fc and being coupled to said first micromechanical member such that a mechanical superposition of said carrier frequency fc and the first frequency ($f_1$) of said first micromechanical member occurs.

14. The processing system of claim 1, wherein at least one of said first, second, and third micromechanical members are one of cantilevers and bridges.

15. The processing system of claim 1, wherein said first, second, and third micromechanical members are comprised of silicon (Si).

16. The processing system of claim 1, further comprising a acoustic detector system, wherein said acoustic detector system comprises:

(a) a microphone (141) for conversion of an acoustic signal (143) into an electric signal, (b) an electric mixer (144) for shifting the frequency spectrum of said electric signal towards a particular higher frequency, and (c) a loudspeaker (145) for generating a frequency-shifted acoustic signal (146) corresponding to the electric signal output by said electronic mixer (144), wherein said loudspeaker (145) is arranged with respect to said processing system (140) such that said frequency-shifted acoustic signal (146) interacts with the micromechanical members (142) of said processing system (140).

17. Mechanical signal processing system comprising a first micromechanical member (60.1) being sensitive to a first frequency ($f_1$), a second micromechanical member (60.2) being sensitive to a second frequency ($f_2$), said members (60.1, 60.2) being coupled via linear coupling means (64) arranged such that said linear coupling means (64) is stimulated so as to oscillate with a superposition of said frequencies ($f_1$, $f_2$) if said first micromechanical member (60.1) is acted upon by a force or acoustic signal of said first frequency ($f_1$) and said second micromechanical member (60.2) is acted upon by a force or acoustic signal of said second frequency ($f_2$), a third micromechanical member (62), provided with an oscillation detector (65), being sensitive to a third frequency ($f_3$) corresponding to the superposition of said first frequency ($f_1$) and said second frequency ($f_2$), said third micromechanical member (62) being coupled via non-linear coupling means (66) to said linear coupling means (64) such that said third micromechanical member (62) is stimulated in a non-linear manner and oscillates at said third frequency ($f_3$), said oscillation at said third frequency being detectable by said oscillation detector (65).

* * * * *